United States Patent
Bondarenko

[15] 3,657,512
[45] Apr. 18, 1972

[54] TIP WELDING MEANS

[72] Inventor: Edward J. Bondarenko, East Brighton, Australia

[73] Assignee: Commonwealth of Australia, Melbourne, Australia

[22] Filed: Jan. 21, 1970

[21] Appl. No.: 4,714

[30] Foreign Application Priority Data

Jan. 22, 1969 Australia ..................49395/69

[52] U.S. Cl. ..........................219/131 R, 219/97, 219/127
[51] Int. Cl............................................................B23k 9/10
[58] Field of Search...................219/131, 135, 69, 108, 114, 219/127, 97, 110, 95, 96

[56] References Cited

UNITED STATES PATENTS

| | | | |
|---|---|---|---|
| 2,235,385 | 3/1941 | Rava | 219/131 |
| 2,784,349 | 3/1957 | Anderson | 219/135 X |
| 2,814,715 | 11/1957 | Blackmer | 219/135 X |
| 3,284,666 | 11/1966 | Hajicek | 219/131 X |
| 3,299,249 | 1/1967 | Sciaky | 219/127 X |
| 3,313,912 | 4/1967 | Pease | 219/108 |
| 3,335,317 | 8/1967 | Sciaky | 219/131 |
| 3,390,246 | 6/1968 | Webb | 219/69 |

OTHER PUBLICATIONS

Precision Gas Tungsten Arc Spot Welding by Agnew & Anderson Welding Research Supplement pp. 270s–275s Primary Examiner—J. V. Truhe
Assistant Examiner—George A. Montanye
Attorney—Woodhams, Blanchard and Flynn

[57] ABSTRACT

An arc welding apparatus including a first source of electric current able to maintain the arc but unable by itself to initiate the arc, and a separate source of electric current able to apply sufficient voltage to initiate the arc, the first source being connected in parallel with the second source and the arc.

13 Claims, 3 Drawing Figures

TIP WELDING MEANS

BACKGROUND OF THE INVENTION i. Field of Invention

The present invention relates to an apparatus for controllably heating a work piece.

ii. Prior Art

In Australian Pat. No. 273,216 there is described an apparatus for heating a work piece, heating being controlled by means of capacitor banks, the period for which the arc is energised being dependent upon the voltages to which the various capacitor banks are changed. Initiation of the arc is effected by breakdown of the air gap by a short-duration high-frequency pulse. The apparatus described in that specification is complex and is costly in having to provide several banks of very heavy duty capacitors. The system is also fed from a mains transformer and is therefore not self-sufficient in its power supply. Further, the high frequency pulse is produced by a tuned transformer connected in series with the arc and the secondary of the transformer therefore has to carry both the high voltage of the pulse and the high current of the arc.

SUMMARY OF THE INVENTION

According to this invention there is provided apparatus for heating a workpiece comprising means for initiating an electric arc between an electrode and the workpiece and means for maintaining the arc once established, characterised in that the arc maintaining means and the arc are connected in parallel with the initiating means.

Because of the parallel connection of the arc initiating means and arc maintaining means, it is possible to effectively isolate these integers from each other so that the need for each one of these components to be capable of carrying the currents and voltages generated by the other be avoided.

In use of the invention, an electric arc is initiated by said initiating means between the workpiece and an electrode spaced therefrom and the arc is permitted to continue for a predetermined time and then extinguished.

In one embodiment of the invention the time is determined by the initial voltage required to maintain the arc and the increase in that voltage as the work piece melts. When the initial voltage plus the increase becomes greater than the voltage available then the arc is extinguished. In this case, the apparatus of the invention may be provided with means for varying the voltage applied by said arc maintaining means; said means may comprise a variable resistor in series with the arc and the initiating means.

In other embodiments of the invention circuit means are provided which operate to extinguish the arc after the predetermined time has elapsed. This circuit means may include a capacitor which is, in use, charged to a predetermined voltage by means of the arc current. The capacitor may, for instance, render a semi-conductor device conductive when it has been charged to said predetermined voltage.

In order to give a clear understanding of the invention some embodiments thereof will now be described in detail with reference to the accompanying drawings.

DESCRIPTION OF PREFERRED EMBODIMENTS

Figure 1:
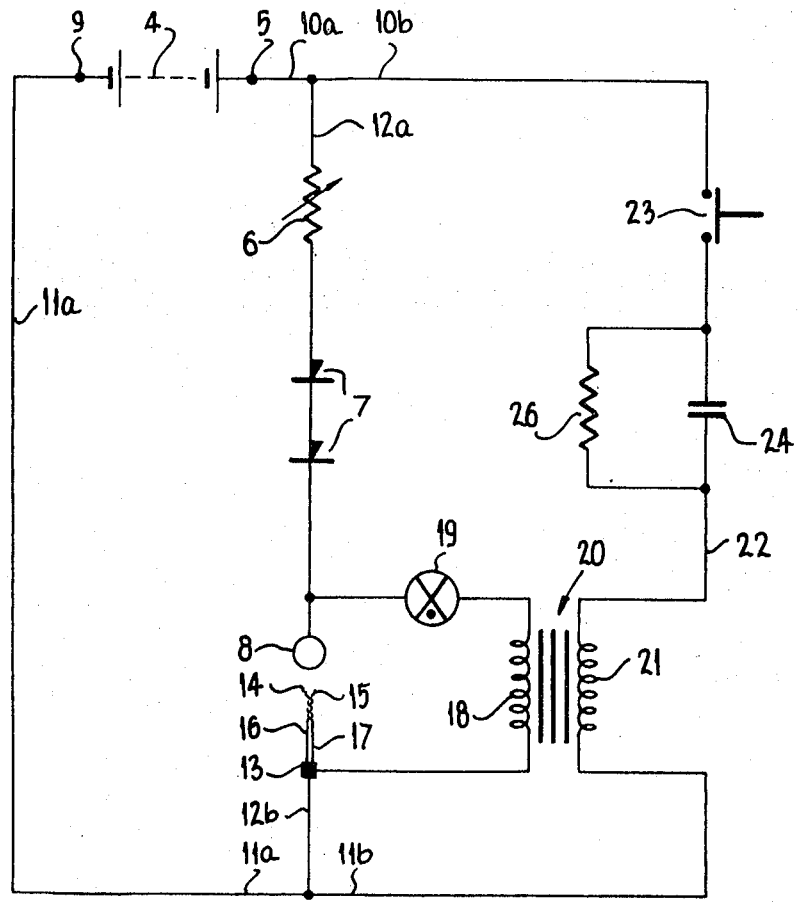
FIG. 1 is a schematic circuit diagram of a first embodiment of the invention.

The embodiment of FIG. 1 comprises a battery 4 of heavy duty accumulators connected in series so as to give 36 volt output. Connected in series with one output terminal 5 by lines 10a, 12a of the battery are a variable resistor 6, a pair of diodes 7 and a welding electrode 8. The other output terminal 9 of the battery is connected by lines 11a, 12b to a connector means 13 for establishing an electrical connection with the twisted ends 14, 15 of two wires 16, 17 which are to be welded together. Wires 16, 17 are formed to provide a second welding electrode by extending them parallel to each other to bring two ends 14, 15 together and twisting the adjacent ends together. Wires 16, 17 may then be mounted in a suitable clamp (not shown) so that the twisted ends protrude a predetermined amount towards the other electrode.

Connected between the first electrode 8 and the connector means 13 is the series combination of the secondary 18 of a transformer 20 and a neon lamp 19. The primary 21 of the transformer is connected in series with the battery 4 and in parallel with the arc by way of lines 10b, 11b and 22 and via a switch 23 and a parallel combination of a capacitor 24 and resistor 26. The primary 21 of the transformer has approximately 100 turns while the secondary 18 has approximately 10,000 turns. Since battery 4 supplies only 36 volts it will not be capable of breaking down the air gap between the first electrode 8 and the wires 16, 17 under normal circumstances. If, however, switch 23 is closed, transformer 20 produces a high voltage, short-duration pulse in the secondary 18 thereof. This pulse appearing between electrode 8 and the wires 16, 17 is sufficient to breakdown the air gap therebetween and the arc, once established, is maintained by the voltage of battery 4 alone.

The arrangement of the transformer in parallel with both the arc and the battery provides the advantage that welding current does not have to pass through transformer 20. Hence, it is possible to use a comparatively light transformer without relying on tuning of the transformer to produce the high voltage breakdown pulse.

Clamp 13 is such that when the wires have been located in the desired position and the clamp has been located, the switch is automatically operated. The clamp may also be arranged to give a variable predetermined spacing between the wires and the first electrode, this spacing being dependent upon the voltage developed in the secondary of transformer 20, thermal characteristics of the material of the wires and the time for which it is desired to heat them.

When the arc is established the wires 16, 17 begin to melt and the length of the gap increases until it can no longer be maintained by the battery, at which point the arc is extinguished. This time depends upon (1) the initial voltage available to maintain the arc, (2) the initial spacing of the first electrode 8 and the wire ends 14, 15, and (3) the rate of increase of that spacing due to melting of the workpiece. Factor (1) is controlled by the output voltage of battery 4, the arc current and the resistance of the variable resistor 6; factor (2) is controlled by the setting of clamp 13 and factor (3) is controlled by the dimensions and thermal characteristics of the wires 16, 17.

Figure 2:
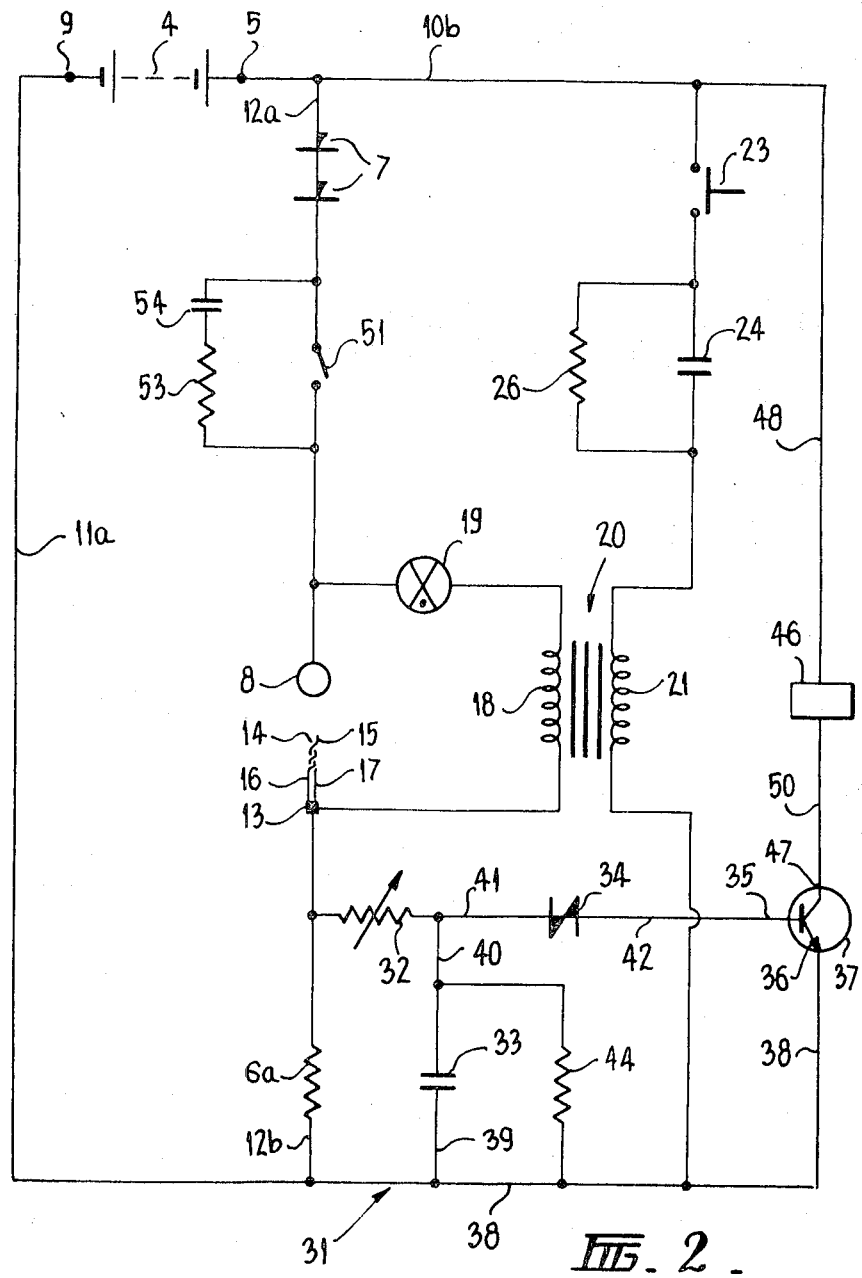
FIG. 2 is a schematic circuit diagram illustrating a modification to the embodiment of FIG. 1.

Although the values of the various components of the circuit shown in FIG. 1 will vary in dependence upon the particular application of the invention, the following values which are representative of one specific embodiment are given:

Diodes 7; BYX 25–1,000
Resistor 6; variable 1–2 ohms
Transformer 20; primary 100 turns, secondary 10,000 turns wound on a Ferroxcube E core
Capacitor 24; 500 µF Neon Lamp 19; Miniature Neon Indicator lamp: one-fourth watt
220 volt without current limiting resistor The embodiment of FIG. 2 includes an electric circuit 31 which is arranged to enable extinction of the arc after a predetermined time. The portion of the circuit shown in FIG. 2 which effects initiation and maintenance of the arc is substantially identical with that shown in FIG. 1 and includes essentially the afore-mentioned battery 4, diodes 7, transformer 20, neon lamp 19, switch 23, capacitor 24 and resistor 26. It will be observed that in this instance, the variable resistor 6 is omitted from line 12a and, instead a corresponding resistor 6a is inserted in line 12b. Resistor 6a is fixed but performs the same function as the resistor 6 in FIG. 1.

Circuit 31 includes a series combination of a variable resistor 32 and capacitor 33 which are together connected in parallel with resistor 6a. Capacitor 33 is connected in series with a zener diode 34 and these are together connected across the base 35 and emitter 36 of transistor 37. This connection is made by means of lines 38, 39, 40, 41 and 42. A resistor 44 is connected in parallel across capacitor 33, and a relay 46 is connected between positive terminal 5 of battery 4 and the collector 47 of transistor 37. This connection being via lines 10b, 48 and 40. A relay switch 51, operable by relay 46, is provided in series with the arc, and in this instance between diodes 7 and electrode 8.

In this arrangement, when the arc has been established, capacitor 33 is charged by a portion of the arc current tapped from the arc circuit via resistor 32. The rate of charging is determined by the setting of resistor 32. Eventually, the capacitor voltage reaches the breakdown voltage of zener diode 34 and the voltage of the capacitor appears between the emitter and base of transistor 37 rendering it conductive and thus energising the relay 46. The relay then opens switch 51 in the arc circuit to extinguish the arc. Resistor 44 serves to discharge capacitor 33 after operation of relay switch 51 in order to ready the circuit for the next cycle of operation. The series connected resistor 53 and capacitor 54 which are connected across switch 51 serve to minimize the otherwise substantial current fluctuations occuring during operation of switch 51. Variation in the elapsed time between initiation and interruption of the arc is determined by the setting of the variable resistor 32.

Figure 3:
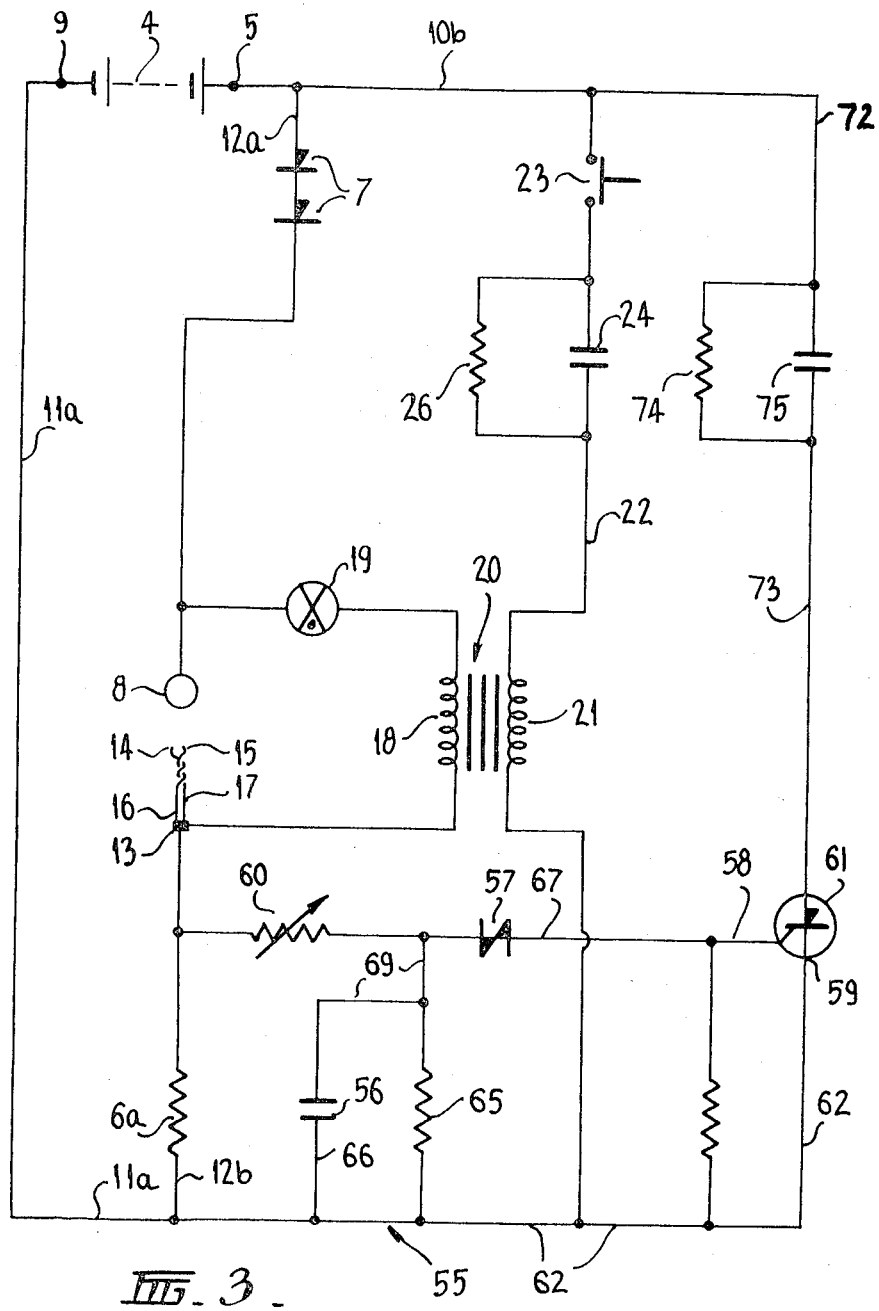
FIG. 3 is a schematic circuit diagram illustrating a second modification to the embodiment of FIG. 1.

The embodiment of FIG. 3 is also generally similar to FIG. 1 except for the inclusion of an electric circuit 55. In this case, the variable resistor 6 is again omitted and replaced by the fixed resistor 6a in line 12b. The electrode 8 is connected directly to terminal 5 of the battery 4 via diodes 7.

The circuit 55 includes a capacitor 56 which is connected in parallel, via variable resistor 60, with resistor 6a. Capacitor 56 is connected in series with a zener diode 57 between the gate 58 and cathode electrode 59 of a silicon controlled rectifier 61. This connection is accomplished via lines 62, 66, 67, 68 and 69. Capacitor 56 is connected in parallel with a discharge resistor 65. The anode of silicon controlled rectifier 61 is connected to the positive terminal 5 of battery 4, via the parallel combination of capacitor 75 and resistor 74, by means of lines 10b, 72 and 73.

In use, the arc is initiated and sustained in the same manner as the embodiment of FIG. 1 and capacitor 56 is charged via resistor 60 after initiation of the arc. When the capacitor reaches the breakdown voltage of zener diode 57 the voltage on the capacitor appears between gate 58 and electrode 59 of silicon controlled rectifier 61 and the arc current previously flowing down line 12a is by-passed through lines 72, 73 and 62.

Immediately rectifier 61 becomes conductive, the capacitor 75 presents virtually a short circuit to battery 4 but as charging proceeds the current drain through lines 72, 73 and 62 falls off so that continued unnecessary drainage on battery 4 is avoided. After extinction of the arc, silicon controlled rectifier 61 is again rendered non-conductive by charging of capacitor 75 and capacitors 56 and 75 discharge through resistors 65 and 74 to ready the circuit for a further cycle of operation.

It will be appreciated that the invention is not limited to the details of the specific embodiments described and that modifications may be made to these specific embodiments. In particular whilst in each described instance, the transformer 20, switch 23 and capacitor 24 are arranged to provide only a single high voltage arc initiating pulse, the circuits could be modified to provide a train of such pulses sustained for a period lasting until the arc is established. This could be accomplished by substituting for capacitor 24 switch 23 and resistor 26 any suitable circuit capable of producing a train of pulses.

It is to be understood that although the described embodiments utilise a battery of accumulators to provide the necessary arc maintaining current other means could be employed. For example, in some applications a single 6 volt accumulator together with a direct current converter to make up the necessary voltage could be utilised. The described embodiments also utilise a neon lamp to isolate the transformer secondary from the arc maintaining circuit. It will be clear, of course, that this neon lamp may be replaced by any suitable gaseous discharge lamp, avalanche diode, zener diode or other voltage dependent resistor.

The above and many other modifications may be made to the invention without departing from the spirit and scope thereof as defined in the appended claims.

I claim:

1. Apparatus for heating a workpiece comprising means for initiating an electric arc between a work electrode and the workpiece and means for maintaining the arc once established and an electric circuit means for extinguishing said arc, said extinguishing means comprising a timing capacitor and means responsive to the state of charge of said capacitor to extinguish the arc, said arc maintaining means and said arc being connected in parallel with said initiating means and a resistive element being provided in a lead from said maintaining means, which lead carries at least a substantial portion of the arc current maintained by said maintaining means, means being provided connecting said timing capacitor in parallel across said resistive element and said responsive means comprising means to by-pass current supplied by said maintaining means to reduce the voltage applied by said maintaining means between said work electrode and said workpiece to thereby extinguish said arc, said means to by-pass current operating when the timing capacitor is charged to a level corresponding to a predetermined time period after initiation of the arc.

2. Apparatus as claimed in claim 1 wherein said means responsive to the state of charge of said timing capacitor comprises an electronic switching device, a load and a zener diode, said electronic switching device having first, second and third electrodes, there being provided means connecting said first electrode to one side of said load, means connecting the other electrode to one side of said load to one side of said maintaining means and means connecting said second electrode to the other side of the maintaining means, said third electrode being a control electrode operable to vary the degree of electric conduction between said first and second electrodes; means being provided connecting said second electrode to one side of said timing capacitor and said third electrode being connected to the other side of the timing capacitor by said Zener diode whereby said electronic switching device operates to place said load across said maintaining means when the charge of said timing capacitor exceeds the breakdown voltage of said zener diode and the electronic switch is thereby rendered conductive; said load being sufficient to effect said reduction in the voltage applied by said maintaining means between said work electrode and said workpiece to thereby extinguish the arc.

3. Apparatus as claimed in claim 2 wherein said load comprises a capacitor.

4. Apparatus as claimed in claim 2 wherein said electronic switching device comprises a silicon controlled rectifier.

5. Apparatus as claimed in claim 1 wherein said means connecting said timing capacitor in parallel across said resistive element comprises an electrical lead interconnecting one side of said resistive element with one side of said capacitor and a variable timing resistor interconnecting the other side of said resistive element with the other side of said timing capacitor.

6. Apparatus for welding together the corresponding ends of a pair of wires, comprising in combination:
a power source;
an electrode and means for mounting said pair of wires in fixed relation to said electrode, with said ends of said wires being located in close spaced juxtaposition and said juxtaposed ends being initially spaced at a predetermined first distance from said electrode for defining an arc gap;
means defining a first series loop for maintaining an established arc between said wire ends and said electrode so as to melt back said wire ends to increase said spacing while fusing said wire ends together, said loop including said power source and arc gap and further comprising unidirectional conducting means and a first resistance of value which allows conduction therethrough from said source through said established arc when said spacing is less than a predetermined second distance, said second distance exceeding said first distance, said power source having a maximum voltage output corresponding to the sum of voltage drops in said first series loop when said spacing is less than but approaches said predetermined second distance;

means defining a second series loop for initiating said arc between said wire ends and said electrode, said second series loop including said power source and further comprising a resistor and capacitor in parallel, a switch and the input circuit of voltage amplifying means, said voltage amplifying means having an output circuit;

means defining a third series loop including said arc gap and further comprising the output circuit of said amplifying means and means defining a voltage dependent resistance for isolating said output circuit from said first series loop following initiation of said arc;

whereby the arc established by said second and third loops and maintained by said first loop will be extinguished at least when said spacing exceeds said second preselected distance and following fusion of said juxtaposed wire ends.

7. Apparatus as defined in claim 6 in which said unidirectional conducting means comprises a diode and said voltage dependent resistance comprises a neon lamp capable of conduction in response to the output of said output circuit but incapable of conduction in response to the voltage drop placed across said gap by said first loop.

8. Apparatus as defined in claim 6 in which said amplifying means comprises a transformer and said input and output circuits comprise input and output windings thereof.

9. Apparatus as defined in claim 6 in which said power source comprises a battery of storage cells.

10. Apparatus as defined in claim 6 in which said first resistance is variable.

11. Apparatus as defined in claim 6 in which said source is a DC source and including means defining a fourth series loop for terminating said arc following fusion of said wire ends but prior to a time at which said spacing would exceed said second predetermined distance, said fourth series loop including said power source and further comprising a switching device and means responsive to a change in state of said switching device for reducing the voltage applied across said arc gap by said first loop to below a level required to maintain said arc, said switching device having a control electrode, and further including a Zener diode and timing means connected to said control electrode through said Zener diode and also connected across said first resistor for producing a voltage which exceeds the Zener voltage of said Zener diode after a preselected duration of arc current flow through said first resistor.

12. Apparatus as defined in claim 11 in which said switching device is a transistor and said fourth series loop includes a relay in series with said transistor, said relay having a contact in said first series loop operable in response to firing of said transistor by said Zener diode.

13. Apparatus as defined in claim 11 in which said switching device comprises an SCR and said fourth series loop includes means responsive to firing of said SCR by said Zener diode for substantially shorting said power source through said SCR for a time sufficient to extinguish said arc and thereafter terminating conduction of said SCR.

* * * * *